United States Patent
Chen et al.

(10) Patent No.: US 8,280,052 B2
(45) Date of Patent: Oct. 2, 2012

(54) DIGITAL SIGNATURE OF CHANGING SIGNALS USING FEATURE EXTRACTION

(75) Inventors: Chin-Ju Chen, Cerritos, CA (US); Eric Heng Chih Lee, Cerritos, CA (US); Matthew R. Kuhlke, San Francisco, CA (US); Ethan Hugg, Seattle, WA (US); Michael A. Ramalho, Sarasota, FL (US)

(73) Assignee: Cisco Technology, Inc., San Jose, CA (US)

( * ) Notice: Subject to any disclaimer, the term of this patent is extended or adjusted under 35 U.S.C. 154(b) by 598 days.

(21) Appl. No.: 12/352,697

(22) Filed: Jan. 13, 2009

(65) Prior Publication Data

US 2010/0180174 A1 Jul. 15, 2010

(51) Int. Cl.
*H04N 7/167* (2011.01)
(52) U.S. Cl. ...................................... 380/229
(58) Field of Classification Search .................. 704/254; 714/752
See application file for complete search history.

(56) References Cited

U.S. PATENT DOCUMENTS

| | | | | |
|---|---|---|---|---|
| 2007/0124145 A1* | 5/2007 | Luan et al. | | 704/254 |
| 2007/0204165 A1* | 8/2007 | Lytle et al. | | 713/176 |
| 2008/0059176 A1* | 3/2008 | Ravi et al. | | 704/250 |
| 2008/0154585 A1* | 6/2008 | Yoshioka | | 704/213 |

* cited by examiner

*Primary Examiner* — Jason K. Gee
*Assistant Examiner* — Abiy Getachew
(74) *Attorney, Agent, or Firm* — Tucker Ellis LLP (57) ABSTRACT

In one embodiment, a signal transmission authentication apparatus includes an input operable to receive a changing signal, a first extractor operable to extract first phoneme data from the received changing signal, a first generator including logic operable to generate first data representative of the extracted first phoneme data, a first output operable to communicate output data corresponding to the received changing signal and the first data from an associated transmitter to an associated receiver, a second extractor associated with the receiver including logic operable to extract second phoneme data from the received output data via the receiver and regenerate the first phoneme data from the received first data, a comparator including logic operable to generate a comparison signal in accordance with a comparison of the first and second phoneme data, and a second output operable to generate a signal corresponding to authenticity of the received changing signal in accordance with an output of the comparator.

20 Claims, 6 Drawing Sheets

DIGITAL SIGNATURE OF CHANGING SIGNALS USING FEATURE EXTRACTION

TECHNICAL FIELD

The present disclosure relates generally to verification of authenticity of messages using digital signatures and, more particularly, to digital signature of changing signals using feature extraction wherein in one example the changing signals may be voice messages and the feature extraction may include speech recognition. However, the present disclosure is not limited to any particular changing signal type or feature set and is not limited to any feature extraction scheme.

BACKGROUND

Digital signature of text messages and of other fixed-type data sent across or through networks is common and well established. The digital signatures are intended to simulate the security properties of handwritten signatures on paper and, to that extent, serve to authenticate the documents, data or items being transmitted. In general, using a key generation algorithm, a sender generates a private key for use by the sender and a public key for use by all others including the intended recipient of the message containing the fixed data. Then, using a signature algorithm, the original document is signed to generate a signature which is transmitted together and sometimes embedded within the original document. The recipient uses the public key and the original document to verify the signature and to prove the authenticity of the document as being from the sender with the private key and as being the document signed by the sender.

Digital signature of signals that change over time such as for example the human auditory signal presents problems, particularly when transcoding of the original message is required. As an example, a voice message may be recorded by a sender in a first format such as by using a G.711 standard encoding scheme also known as pulse-code modulation (PCM) wherein signals of voice frequencies are sampled at a selected rate such as about 8000 samples per second. The message may be broadcast onto or through a network and obtained by one or more receivers. However, some of the message recipients may utilize a different decoding scheme at their respective endpoints. As an example, a message may be received at an IP phone using G.722 improved standard encoding scheme. Thus, a digital signature associated with the original message encoded by the sender using a first scheme such as G.711 could not be used to verify the authenticity of the original message by receivers or recipients using a different decoding scheme such as G.722 for example.

BRIEF DESCRIPTION OF THE DRAWINGS

The accompanying drawings incorporated herein and forming a part of the specification illustrate example embodiments and, together with the description, serve to explain the principles of the embodiments.

OVERVIEW OF EXAMPLE EMBODIMENTS

The following presents a simplified summary of the example embodiments in order to provide a basic understanding of some features of the example embodiments. This summary is not an extensive overview of the example embodiments. It is intended to neither identify key or critical elements nor to delineate the scope of the embodiments. Its sole purpose is to present some concepts of the example embodiments in a simplified form as a prelude to the more detailed description that is presented later.

In accordance with an example embodiment, a signal transmission authentication apparatus is provided. The apparatus includes a receiver input associated with a receiver and operable to receive a changing signal and first phoneme data corresponding to the received changing signal from an associated transmitter and a receiver extractor associated with the receiver including logic operable to extract second phoneme data from the received changing signal data. The apparatus also includes a comparator including logic operable to generate a comparison signal in accordance with a comparison of the first and second phoneme data and a receiver output operable to generate a signal corresponding to authenticity of the received changing signal in accordance with an output of the comparator.

In accordance with another example embodiment, a method of authenticating a changing signal is provided. The method includes receiving, from an associated transmitter, a changing signal and first phoneme data corresponding to the received changing signal at an associated receiver and extracting second phoneme data from the received changing signal at the associated receiver. The method also includes generating a comparison signal in accordance with a comparison of the first and second phoneme data and generating a signal corresponding to authenticity of the received changing signal in accordance with an output of the comparison.

In accordance with a further example embodiment, logic encoded in one or more tangible medium is operable when executed to receive, from an associated transmitter, a changing signal and first phoneme data corresponding to the changing signal to an associated receiver, extract second phoneme data from the received changing signal via the associated receiver, generate a comparison signal in accordance with a comparison of the first and second phoneme data, and generate a signal corresponding to authenticity of the received changing signal in accordance with an output of the comparator.

In accordance with another example embodiment, a signal transmission authentication apparatus is provided. The apparatus includes a transmitter input operable to receive a changing signal, a transmitter extractor operable to extract phoneme data from the changing signal received at the transmitter input, and a transmitter output operable to communicate the changing signal and the first phoneme data to an operatively associated network.

There are shown and described herein example embodiments simply by way of illustration of at least one of the modes best suited to carry out an example embodiment. As it will be realized, different embodiments are possible, and several details are capable of modifications in various obvious ways. Accordingly, the drawings and descriptions herein are to be regarded as illustrative in nature and not as restrictive.

DESCRIPTION OF EXAMPLE EMBODIMENTS

This description provides examples only and is not intended to limit the scope of the claims. The figures generally indicate the features of the example embodiments, where it is to be understood and appreciated that like reference numerals are used to refer to like elements.

Figure 1:
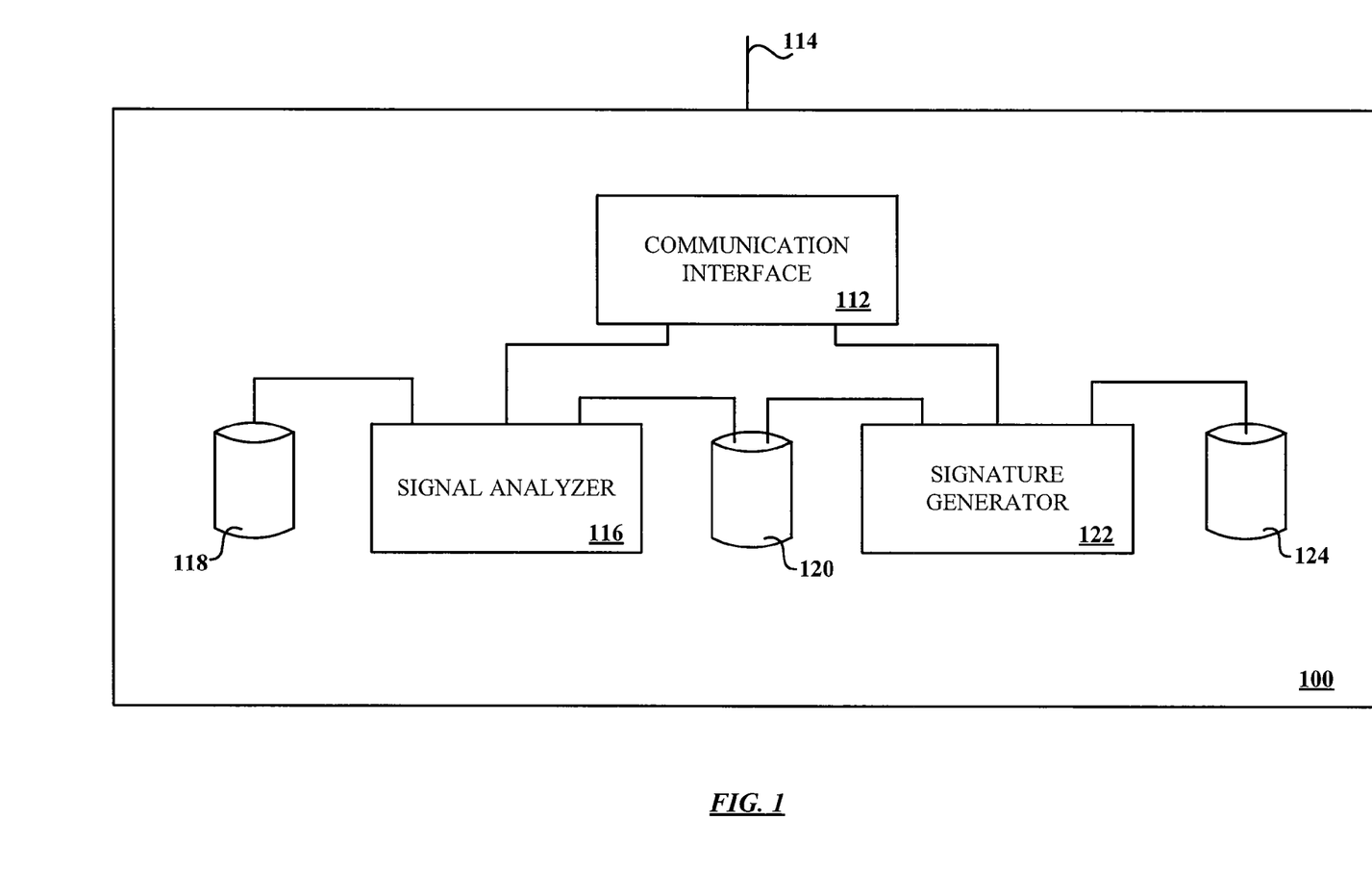
FIG. 1 is a simplified block diagram illustrating an apparatus configured in accordance with an example embodiment.

FIG. 1 is a block diagram illustrating a system 100 configured in accordance with an example embodiment to verify authenticity of changing signals such as audio, video, voice or analog signals of any type for example. The system 100 comprises a communication interface 112 with a communication link 114 configured to be coupled to an associated network (not shown) such as an intranet or the Internet. The communication link may be a wired link (e.g. a coaxial cable, cat. 5 link, etc.) or a wireless (e.g. RF, IR, etc.) connection. Communication interface 112 sends and receives messages and data through the link 114 to and from a plurality of other users and systems operatively connected with the associated network. In accordance with the example embodiments, changing signals contained within the messages may be selectively signed to verify their authenticity.

A signal analyzer 116 is in data communication with communication interface 112 and includes logic operable to analyze changing signals based on one or more feature sets 118 to determine feature set data 120 of the changing signals. A signature generator 122 includes logic configured to generate signatures for the changing signals for selective transmission to an associated network using the communication interface. In one example embodiment, the signature generator uses the determined feature set data 120 and a key data 124 to generate the signatures for the changing signals. The changing signals may be audio messages, such as voice messages for example, sent from the system 100 and to verify their authenticity. "Logic" and "signal" as used herein, includes but is not limited to hardware, firmware, software and/or combinations of each to perform a function(s) or an action(s), and/or to cause a function or action from another component. For example, based on a desired application or need, signals may be based in hardware or software and logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that may be executed by a processor and signal may be software code, software steps, and/or data stored in memory.

Figure 2:
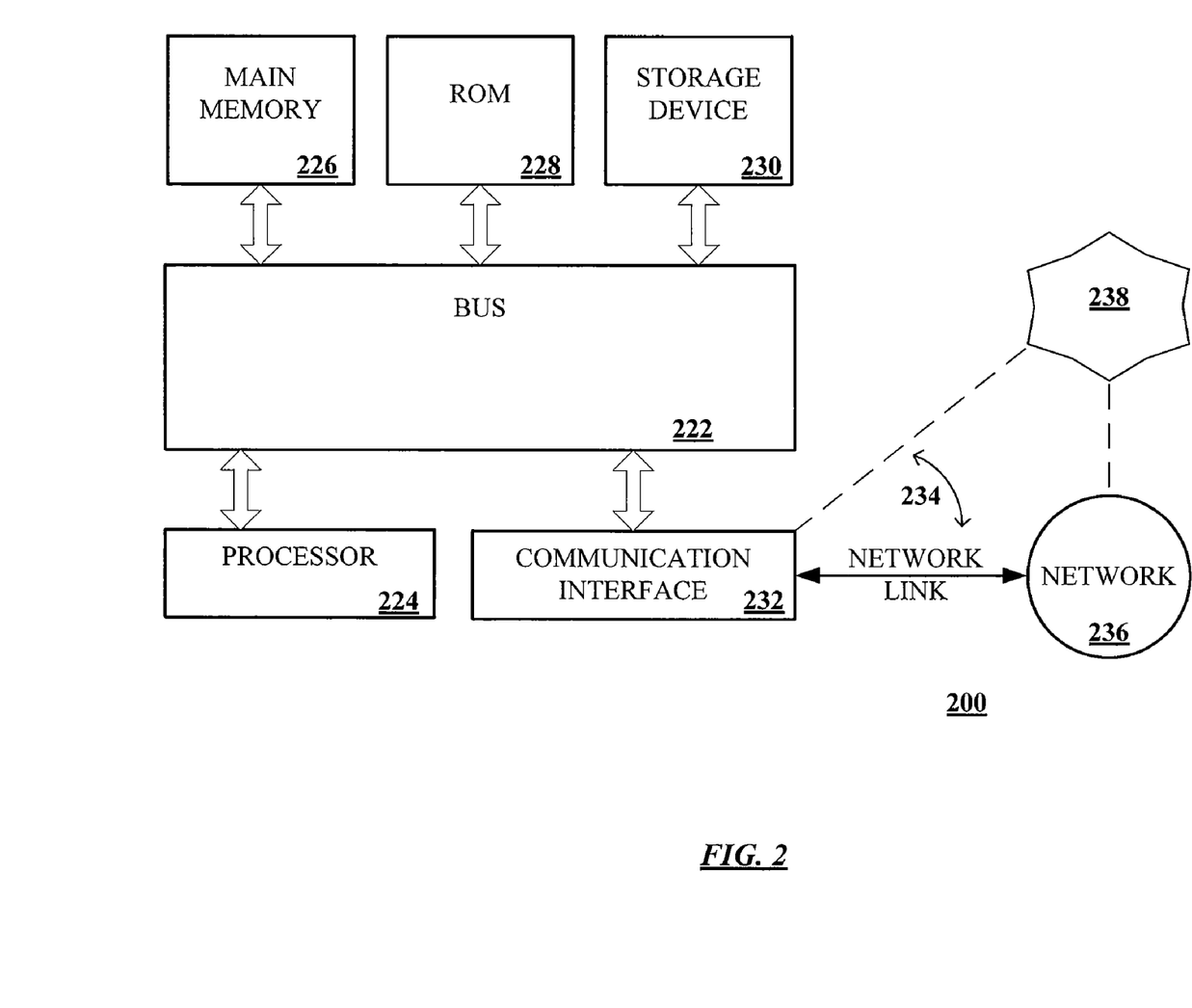
FIG. 2 is a block diagram of a computer system for implementing an example embodiment.
Figure 3:
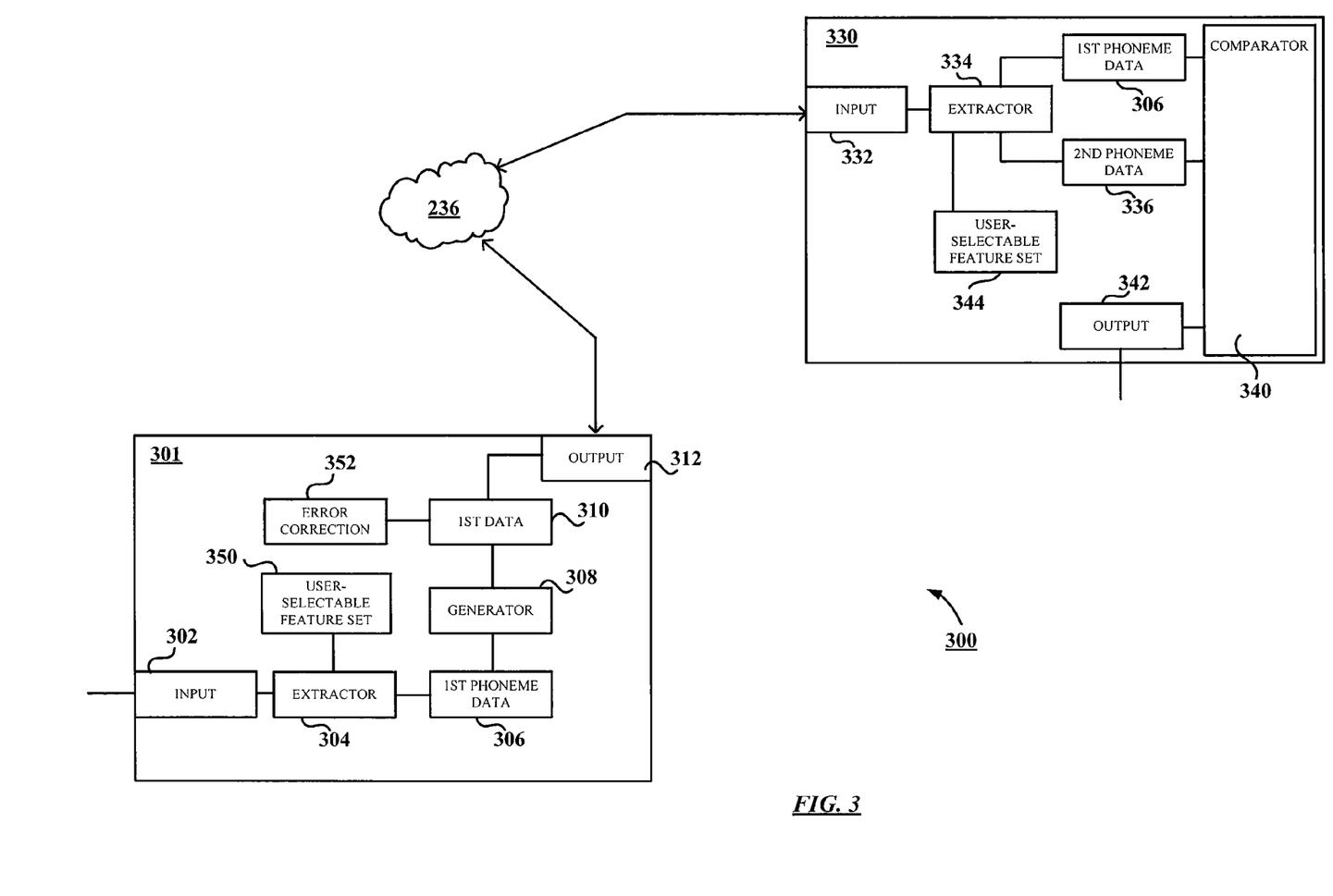
FIG. 3 is a functional block diagram illustrating entities and components in an apparatus configured in accordance with an example embodiment.

FIG. 2 is a block diagram of a computer system 200 for implementing an example embodiment. For example, computer system 200 is suitably adapted for implementing a signal verification system 100 (FIG. 1) and a signal transmission authentication apparatus 300 (FIG. 3). Computer system 200 includes a bus 222 or other communication mechanism for communicating information and a processor 224 coupled with bus 222 for processing information. Computer system 200 also includes a main memory 226, such as random access memory (RAM) or other dynamic storage device coupled to bus 222 for storing information and instructions to be executed by processor 224. Main memory 226 also may be used for storing a temporary variable or other intermediate information during execution of instructions to be executed by processor 224. Computer system 200 further includes a read only memory (ROM) 228 or other static storage device coupled to bus 222 for storing static information and instructions for processor 224. A storage device 230, such as a magnetic disk or optical disk, is provided and coupled to bus 222 for storing information and instructions.

The embodiments are related to the use of computer system 200 for creating signatures for changing signals such as voice messages for example, and verifying the authenticity of signed changing signals. According to one embodiment, signing and signature verification is provided by computer system 200 in response to processor 224 executing one or more sequences of one or more instructions contained in main memory 226. Such instructions may be read into main memory 226 from another computer-readable medium, such as storage device 230. Execution of the sequence of instructions contained in main memory 226 causes processor 224 to perform the process steps described herein. One or more processors in a multi-processing arrangement may also be employed to execute the sequences of instructions contained in main memory 226. In alternative embodiments, hard-wired circuitry may be used in place of or in combination with software instructions to implement the features of the embodiment. Thus, embodiments are not limited to any specific combination of hardware circuitry and software.

The term "computer-readable medium" as used herein refers to any medium that participates in providing instructions to processor 224 for execution. Such a medium may take many forms, including but not limited to non-volatile media, volatile media, and transmission media. Non-volatile media include for example optical or magnetic disks, such as storage device 230. Volatile media include dynamic memory such as main memory 226. Transmission media include coaxial cables, copper wire and fiber optics, including the wires that comprise bus 222. Transmission media may also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer may read.

Various forms of computer-readable media may be involved in carrying one or more sequences of one or more instructions to processor 224 for execution. For example, the instructions may initially be borne on a magnetic disk of a remote computer. The remote computer may load the instructions into its dynamic memory and send the instructions over a telephone line using a modem. A modem local to computer system 220 may receive the data on the telephone line and use an infrared transmitter to convert the data to an infrared signal. An infrared detector coupled to bus 222 may receive the data carried in the infrared signal and place the data on bus 222. Bus 222 carries the data to main memory 226 from which processor 224 retrieves and executes the instructions. The instructions received by main memory 226 may optionally be stored on storage device 230 either before or after execution by processor 224.

Computer system 200 also includes a communication interface 232 coupled to bus 222. Communication interface 232 provides a two-way data communication coupling to a network link 234 that is connected to a network 236. For example, communication interface 232 may be a local area network (LAN) card to provide a data communication connection to a compatible LAN. Wireless links may also be implemented. In any such implementation, communication interface 232 sends and receives electrical, electromagnetic, or optical signals that carry digital data streams representing various types of information. The interface 232 is part of the communication interface 112 of the system 100 described above.

Network link 234 typically provides data communication through one or more networks to other data devices, such as nodes, APs, endpoints, etc. For example, network link 234 may provide a connection through network 236 to the Internet 238. Network 236 and the Internet 238 may use electrical, electromagnetic, or optical signals that carry the digital data to and from computer system 200, which are exemplary forms of carrier waves transporting the information. The link 234 is part of the communication interface 112 of the system 100 described above.

Computer system 200 may send messages and receive data, including program code, through the network(s), network link 234, and communication interface 232. In the Internet example, a server (not shown) might transmit a requested code for an application program through the Internet to network 236, and communication interface 232. In accordance with an example embodiment, one such downloaded application provides for signature of a changing signal such as a voice message, and for verification of signed changing signals such as signed voice messages as described herein.

The received code may be executed by processor 224 as it is received, and/or stored in storage device 230, or other non-volatile storage for later execution. In this manner, computer system 200 may obtain application code in the form of a carrier wave.

FIG. 3 is a functional block diagram of a signal transmission authentication apparatus 300 in accordance with an embodiment. With reference now to that Figure, the apparatus 300 includes an input 302 operable to receive a changing signal. The changing signal may be of any form including without limitation audio signals, n-dimensional signals, voice signals, and analog signals to name a few. A first extractor 304 is operable to extract first phoneme data 306 from the received changing signal. It is to be appreciated that for purposes of the embodiments described herein, the expression "phoneme data" is not to be construed narrowly as being limited to only audible sounds such as for example human speech but rather, it to be understood in its broadest sense, wherein a phoneme is the smallest posited structural unit that distinguishes meaning for any varying or changing signal. As used herein, phonemes may not be physical segments themselves, but, in theoretical terms, may be cognitive abstractions or categorizations of them. A first generator 308 includes logic operable to generate first data 310 representative of the extracted first phoneme data 306. A first output 312 is operable to communicate output data corresponding to the received changing signal and the first data from an associated transmitter 301 to an associated receiver 330. In one embodiment, the first output 312 is operable to communicate the first data 310 concatenated with the output data corresponding to the changing signal to the associated receiver 330.

A second extractor 334 of the associated receiver 330 includes logic operable to extract second phoneme data 336 from the received output data via the associated receiver 330 and regenerate the first phoneme data 306 from the received first data. A comparator 340 includes logic operable to generate a comparison signal in accordance with a comparison of the first phoneme data 306 sent to the associated receiver 330 from the associated transmitter 301 and the second phoneme data 336 generated by the second extractor 334 at the associated receiver 330. A second output 342 is operable to generate a signal corresponding to authenticity of the received changing signal in accordance with an output of the comparator 340.

In one embodiment, the changing signal received at the input 302 of the associated transmitter 301 is an audio signal. In another embodiment, the changing signal is a speech signal such as a voice message for example. Still further, the changing signal may be any one or more n-dimensional changing signal.

In the example embodiment wherein the changing signal is a voice message, one or both of the feature extractors 304, 334 are preferably a voice recognition modules adapted to process the changing signal using an internal set of phonemes, wherein each phoneme in the set of phonemes is associated or paired with a corresponding predetermined value or weight. As an example, /i/ is assigned "1,"/p/ is assigned "2,"/s/ is assigned "10," etc. In that way, using the internal set of phonemes, the voice recognition modules of the feature extractors 304, 334 analyze the voice message and generate a string of number values as the phoneme data sets 306, 336. The extracted data set 306 may be digitally signed in another embodiment by generator 308 at the associated transmitter 301 using a private key or the like to generate the first data 310 corresponding to the voice message changing signal received at the input 302.

In the example embodiment, although the changing signal received may be voice message including a human auditory signal, it is to be appreciated that the embodiments have much broader application and range and that authentication apparatus 300 is adaptable to receive and process all types and forms of varying signals such as, for example, audio signals, video signals, audio/visual signals, sonar, radar, or any other form of changing one-dimensional, two-dimensional or n-dimensional changing signals that are amenable to or may be processed by feature extraction In another embodiment, the first generator 308 includes logic operable to generate a signature of the changing signal based on the extracted first phoneme data 306. Further, the second output 342 is operable to generate a signal corresponding to authenticity of the received changing signal as being from the associated transmitter 301 based on the signature.

In a further embodiment, the first extractor 304 includes logic operable to extract the first phoneme data 306 in accordance with a first user-selectable feature set 350. Also, the second extractor 334 includes logic operable to extract the second phoneme data 336 in accordance with a second user-selectable feature set 344. This is useful to help improve the robustness of the apparatus 300 wherein certain portions of the changing signal may be selected to be effectively ignored by not classifying those portions having certain signal characteristics. As an example the user selectable feature set 350 may be used to tune the system to not classify the "t" sound because of its short duration. Other hard consonant sounds may be effectively ignored by not classifying them as well based on the feature set module 350. In their preferred form, one or both of the user selectable feature sets 350, 344 are adjustable by users of the system. Essentially, they are configured to provide user control over the set of phonemes used by the respective extractors 304, 334 to suitably generate the data sets 306, 336.

In this way, one or both of the feature extractors 306, 334 may be tuned to particular languages in the voice example embodiment, and, further, may be tuned for robustness for network transmission of the original or source changing (voice) signal. Using the feature set modules 350, 344 the feature set is tuned or otherwise adjusted such as by weighting selected features, so that only the long-lived features, auditory in the example, are recognized by the feature extractors 304, 334. Long-lived features are those which typically last longer than the packetization period of the associated communications network. As an example, single pop, snap, or short-time plosives (such as the "p" in Peter for example) which would typically be within a packetization period, would not qualify as a long-lived feature and therefore would not be included in the series of extracted feature set data from which the signature is generated. The use of long-lived features to the selective exclusion of short-lived features improves the robustness of the system 300 to protect for random packet loss.

In a still further embodiment, an encoder 352 includes logic operable to encode the first data 310 representative of the extracted first phoneme data 306 in accordance with an error correction encoding scheme. In addition, the second extractor 334 further includes logic operable to extract the second phoneme data in accordance with the error correction encoding. In this way, the first data 310 may be re-created at the receiver 330 end if necessary should a fragment or packet thereof be lost using the error correction code generated by the error correction module 352.

Figure 4:
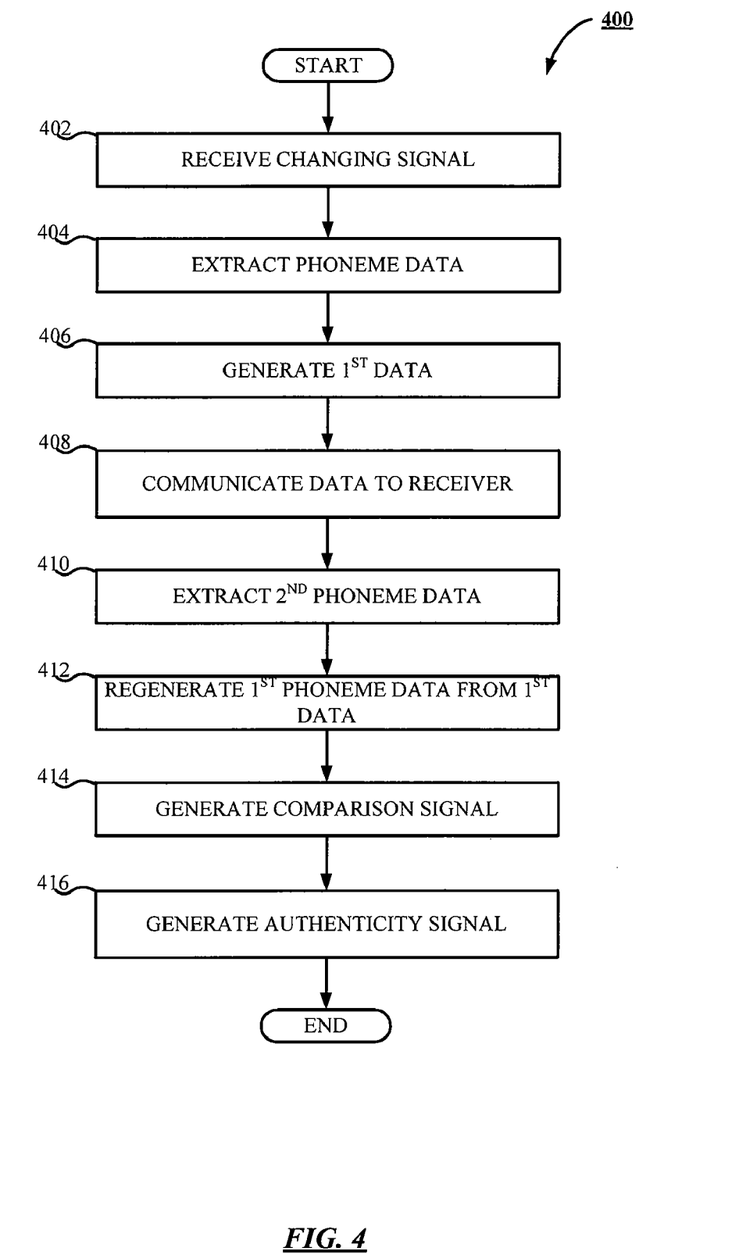
FIG. 4 is a flow diagram illustrating steps executed by the entities and components of the apparatus shown in FIGS. 1-3 in accordance with an example embodiment.

FIG. 4 is flow diagram illustrating steps executed by the entities and components of the apparatus shown in FIGS. 1-3 in accordance with an example embodiment. Turning now to that figure, a method 400 of authenticating a changing signal is shown including a step of receiving 402 a changing signal such as, for example, a voice message or other audio signal. First phoneme data 306 is extracted 404 from the received changing signal and first data 310 representative of the extracted first phoneme data 306 is generated 406. The first data 310 and output data corresponding to the received changing signal is communicated 408 by the associated transmitter 301 as output data to an associated receiver 330. At step 410, second phoneme data 336 is extracted from the output data received via the associated receiver 330 and, at step 412, the first phoneme data 306 is regenerated from the received first data 310. A comparison signal is generated at 414 in accordance with a comparison of the first and second phoneme data. Thereafter, a signal corresponding to authenticity of the received changing signal is generated at 416 in accordance with an output of the comparison.

Figure 5:
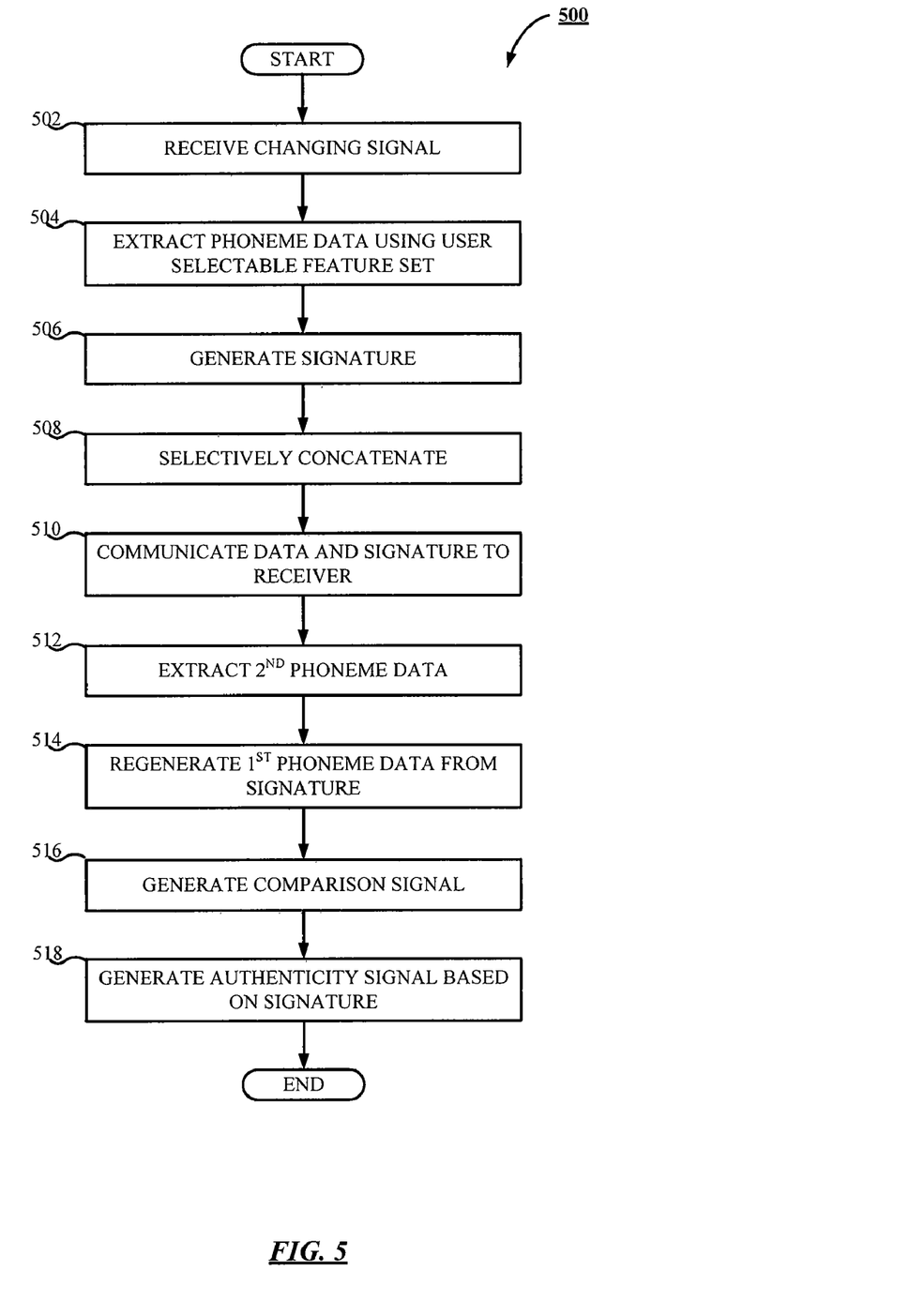
FIG. 5 is a flow diagram illustrating steps executed by the entities and components of the apparatus shown in FIGS. 1-3 in accordance with a further example embodiment.

FIG. 5 is flow diagram illustrating steps executed by the entities and components of the apparatus shown in FIGS. 1-3 in accordance with another example embodiment. Turning now to that figure, a method 500 of authenticating a changing signal is shown including a step of receiving 502 a changing signal such as, for example, a voice message or other audio signal. First phoneme data is extracted 504 from the received changing signal. In one embodiment, the first phoneme extracting step 504 includes selectively extracting the first phoneme data in accordance with a first user-selectable feature set 350. In step 506, a signature of the changing signal is generated based on the extracted phoneme data 306. The changing signal may be signed using the extracted phoneme data 306 as inputs to a signature algorithm. In step 508 the signature is selectively concatenated with output data corresponding to the received changing signal. The signature and output data are communicated 510, in one embodiment concatenated, by the associated transmitter 301 to the associated receiver 330. At step 512, second phoneme data is extracted from the received output data via the receiver 330 and at step 514 the first phoneme data is regenerated from the received signature. A comparison signal is generated at 516 in accordance with a comparison of the first and second phoneme data. Thereafter, a signal corresponding to authenticity of the received changing signal as being from the associated transmitter 301 is generated at 518 in accordance with an output of the comparison and based on the signature.

Figure 6:
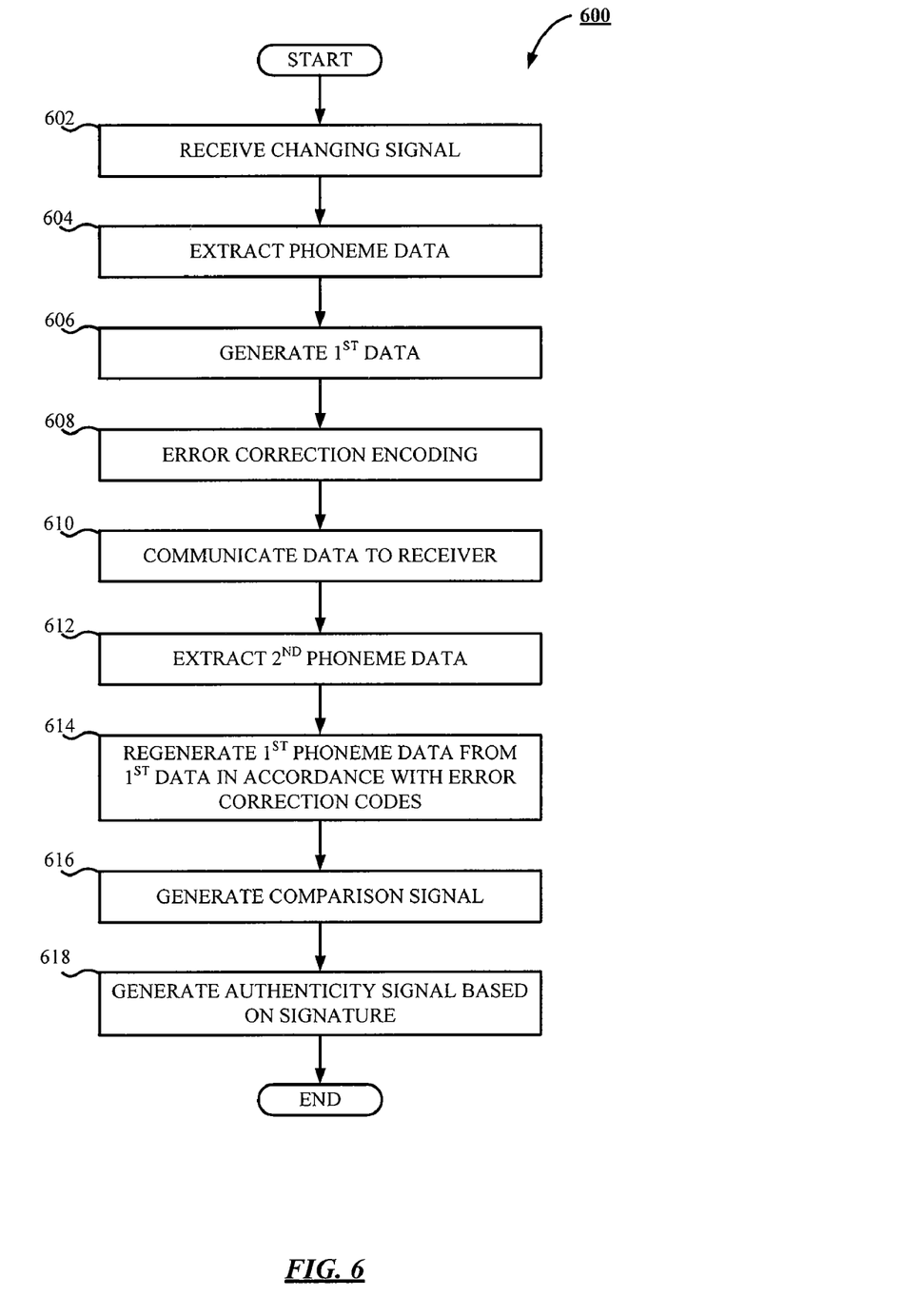
FIG. 6 is a flow diagram illustrating steps executed by the entities and components of the apparatus shown in FIGS. 1-3 in accordance with a further example embodiment.

FIG. 6 is flow diagram illustrating steps executed by the entities and components of the apparatus shown in FIGS. 1-3 in accordance with yet another example embodiment. Turning now to that figure, a method 600 of authenticating a changing signal is shown including a step of receiving 602 a changing signal such as, for example, a voice message or other audio signal. First phoneme data is extracted 604 from the received changing signal and first data representative of the extracted first phoneme data is generated 606. The first data is encoded at step 608 using an error correction encoding and thereafter, the first encoded data and the output data corresponding to the received changing signal is communicated 610 by the associated transmitter 301 to the an associated receiver 330. At step 612, the second phoneme data is extracted from the received output data via the receiver 330. The first phoneme data is regenerated from the received first data in accordance with error correction encoding at step 614. A comparison signal is generated at 616 in accordance with a comparison of the first and second phoneme data. Thereafter, a signal corresponding to authenticity of the received changing signal is generated at 618 in accordance with an output of the comparison.

What has been described above includes example implementations. It is, of course, not possible to describe every conceivable combination of components or methodologies for purposes of describing the various embodiments, but one of ordinary skill in the art will recognize that many further combinations and permutations are possible. Accordingly, the scope of the appended claims are to be interpreted in accordance with the breadth to which they are fairly, legally, and equitably entitled include all such equivalents, alterations, modifications, and variations.

The invention claimed is:

1. A signal transmission authentication apparatus comprising:
   a receiver input associated with a receiver and operable to receive from an associated transmitter a changing signal and a first signature based on first phoneme data corresponding to the received changing signal;
   a receiver extractor associated with the receiver, the receiver extractor including logic operable to extract, in accordance with a first user-selectable feature set, second phoneme data from the received changing signal data, wherein the first user-selectable feature set is selectively adjusted by an associated user to provide user control over a set of phonemes used by the receiver extractor to extract the second phoneme data from the received changing signal data;
   a signature generator including logic operable to regenerate the first phoneme data from the first signature;
   a comparator including logic operable to generate a comparison signal in accordance with a comparison of the second phoneme data and the first phoneme data regenerated from the first signature; and,
   a receiver output operable to generate a signal corresponding to authenticity of the received changing signal in accordance with an output of the comparator.

2. The apparatus to claim 1 further comprising a transmitter including:
   a transmitter input operable to receive the changing signal prior to communication thereof to the receiver input;
   a transmitter extractor operable to extract the first phoneme data from the received changing signal so as to be incorporated as a signature of the changing signal; and,
   a transmitter output operable to communicate the changing signal and the first phoneme data to the associated receiver.

3. The apparatus according to claim 2 wherein the changing signal includes an audio signal.

4. The apparatus according to claim 2 wherein: the transmitter extractor includes logic operable to extract the first phoneme data in accordance with a first user-selectable feature set; and,
the receiver extractor includes logic operable to extract the second phoneme data in accordance with a second user-selectable feature set.

5. The apparatus according to claim 2: further including an encoder including logic operable to encode the first phoneme data in an error correction encoding; and,
the second extractor includes logic operable to extract the second phoneme data in accordance with the error correction encoding.

6. The apparatus according to claim 2 wherein the transmitter output is operable to communicate the first phoneme data concatenated with the changing signal to the associated receiver.

7. A method in an associated signal transmission authentication apparatus of authenticating a changing signal, the method comprising:
receiving by a receiver input of the associated signal transmission authentication apparatus a changing signal and a first signature based on first phoneme data corresponding to the received changing signal at an associated receiver;
in accordance with a first user-selectable feature set, extracting by a receiver extractor of the associated signal transmission authentication apparatus second phoneme data from the received changing signal at the associated receiver, wherein the first user-selectable feature set is selectively adjusted by an associated user to provide user control over a set of phonemes used by the receiver extractor to extract the second phoneme data from the received changing signal data;
regenerating by a signal generator of the associated signal transmission authentication apparatus the first phoneme data from the first signature;
generating by a comparator of the associated signal transmission authentication apparatus a comparison signal in accordance with a comparison of the second phoneme data and the first phoneme data regenerated from the first signature; and,
generating by a receiver output of the associated signal transmission authentication apparatus a signal corresponding to authenticity of the received changing signal in accordance with an output of the comparison.

8. The method according to claim 7 wherein the receiving a changing signal includes receiving an audio signal.

9. The method according to claim 7 wherein:
receiving, at the associated transmitter, the changing signal prior to communication thereof to the receiver input;
extracting, at the associated transmitter, the first phoneme data from the received changing signal so as to be incorporated as a signature of the changing signal; and,
communicating the changing signal and the first phoneme data from the associated transmitter to the associated receiver.

10. The method according to claim 9 wherein:
the extracting first phoneme data includes extracting first phoneme data in accordance with a first user-selectable feature set; and,
the extracting second phoneme data includes extracting second phoneme data in accordance with a second user-selectable feature set.

11. The method according to claim 9 further comprising:
encoding the first phoneme data in an error correction encoding; and,
extracting the second phoneme data in accordance with the error correction encoding.

12. The method according to claim 9 wherein the communicating includes communicating the first phoneme data concatenated with the changing signal to the associated receiver.

13. Logic encoded in one or more tangible non-transitory medium for execution by an associated signal transmission authentication apparatus and when executed by an associated signal transmission authentication apparatus the logic being operable to:
receive, from an associated transmitter, a changing signal and a first signature based on first phoneme data corresponding to the changing signal to an associated receiver;
extract, in accordance with a first user-selectable feature set, second phoneme data from the received changing signal via the associated receiver, wherein the first user-selectable feature set is selectively adjusted by an associated user to provide user control over a set of phonemes used by the receiver extractor to extract the second phoneme data from the received changing signal data;
regenerating the first phoneme data from the first signature;
generate a comparison signal in accordance with a comparison of the second phoneme data and the first phoneme data regenerated from the first signature; and,
generate a signal corresponding to authenticity of the received changing signal in accordance with an output of the comparator.

14. The logic of claim 13 wherein the changing signal is comprised of an audio signal.

15. The logic of claim 13 further including logic when executed operable to:
receive, at the associated transmitter, the changing signal prior to communication thereof to the receiver input;
extract, at the associated transmitter, the first phoneme data from the received changing signal so as to be incorporated as a signature of the changing signal; and,
communicate the changing signal and the first phoneme data from the associated transmitter to the associated receiver.

16. The logic of claim 15 further including logic when executed operable to:
extract the first phoneme data in accordance with a first user-selectable feature set; and,
extract the second phoneme data in accordance with a second user-selectable feature set.

17. The logic of claim 15 further including logic when executed operable to:
encode the first phoneme data in an error correction encoding; and,
extract the second phoneme data in accordance with the error correction encoding.

18. The logic of claim 15 wherein the first phoneme data is concatenated with the changing signal.

19. A signal transmission authentication apparatus comprising: a transmitter input operable to receive a changing signal; a transmitter extractor operable to extract, in accordance with a first user-selectable feature set, phoneme data from the changing signal received at the transmitter input, wherein the first user-selectable feature set is selectively adjusted by an associated user to provide user control over a set of phonemes used by the receiver extractor to extract the second phoneme data from the received changing signal data;

a signature generator operable to generate signature data in accordance with at least one of the changing signal or the phoneme data; and,     a transmitter output operable to communicate the changing signal, the signature data, and the first phoneme data to an operatively associated network.

20. The apparatus according to claim 19:

further including an encoder including logic operable to encode the phoneme data in an error correction encoding; and, wherein the transmitter output is operable to communicate the changing signal and the phoneme data in the error correction encoding to the operatively associated network.

\* \* \* \* \*